(12) United States Patent
Wang et al.

(10) Patent No.: US 11,437,928 B2
(45) Date of Patent: Sep. 6, 2022

(54) ADAPTIVELY MODULATED MULTI-STATE INVERTER SYSTEM AND MODULATING METHOD THEREOF

(71) Applicant: Shanghai Maritime University, Shanghai (CN)

(72) Inventors: Tianzhen Wang, Shanghai (CN); Han Wang, Shanghai (CN)

( * ) Notice: Subject to any disclaimer, the term of this patent is extended or adjusted under 35 U.S.C. 154(b) by 0 days.

(21) Appl. No.: 17/396,715

(22) Filed: Aug. 8, 2021

(65) Prior Publication Data

US 2022/0060124 A1 Feb. 24, 2022

(51) Int. Cl.
| | |
|---|---|
| *H02M 7/53* | (2006.01) |
| *H02M 7/537* | (2006.01) |
| *H02M 7/48* | (2007.01) |
| *H02M 7/521* | (2006.01) |
| *H02M 1/00* | (2006.01) |

(Continued)

(52) U.S. Cl.
CPC ............ *H02M 7/521* (2013.01); *G06F 17/16* (2013.01); *H02M 1/009* (2021.05); *H02M 1/0012* (2021.05); *H02M 1/0845* (2013.01); *H02M 7/48* (2013.01); *H02M 7/53* (2013.01); *H02M 7/537* (2013.01); *H02P 27/10* (2013.01); *H02P 2209/05* (2013.01)

(58) Field of Classification Search
CPC .......... H02M 7/48; H02M 7/53; H02M 7/537; H02M 7/53803
See application file for complete search history.

(56) References Cited

U.S. PATENT DOCUMENTS

| | | | |
|---|---|---|---|
| 2016/0254783 A1* | 9/2016 | Unru | H02S 50/00 |
| | | | 324/658 |
| 2018/0062540 A1* | 3/2018 | Hsin | H02M 7/537 |

FOREIGN PATENT DOCUMENTS

| | | | | |
|---|---|---|---|---|
| CN | 104617759 A | * | 5/2015 | .............. H02M 1/32 |
| CN | 106505903 A | | 3/2017 | |

(Continued)

*Primary Examiner* — Gary A Nash
(74) *Attorney, Agent, or Firm* — Lei Jiang

(57) ABSTRACT

The present invention provides an adaptively modulated multi-state inverter system, comprising: a split capacitor, four bridge arms and an isolation switch group, on each of the four bridge arms a pair of complementary power switch groups is arranged; the isolation switch group comprises four fuses and six bidirectional thyristors. The output branches of the first bridge arm, the second bridge arm and the third bridge arm are respectively connected in series with a fuse to output a three-phase voltage, and at three-phase output voltage side two shared auxiliary branches are arranged, one auxiliary branch starts from the fourth bridge arm output branch on which a fuse is connected in series and is then connected to the output terminal of the three-phase voltage via three bidirectional thyristors. The other auxiliary branch starts from the DC side feed branch from the midpoint of the split capacitor, and is connected with the output terminal of the three-phase voltage via three bidirectional thyristors respectively. The invention also provides a modulating method of the multi-state inverter system. The use of the adaptive modulating technology enables the multi-state inverter to have the functions of overcurrent protection, isolation of faulty bridge arms and fault-tolerant control on any single and double bridges.

2 Claims, 8 Drawing Sheets

(51) Int. Cl.
    *G06F 17/16*     (2006.01)
    *H02M 1/084*     (2006.01)
    *H02P 27/10*     (2006.01)

(56) References Cited

FOREIGN PATENT DOCUMENTS

| | | | | |
|---|---|---|---|---|
| CN | 107508481 A | | 12/2017 | |
| CN | 107800318 A | | 3/2018 | |
| CN | 108649843 A | * | 10/2018 | |
| CN | 108809203 A | * | 11/2018 | ............ H02P 29/032 |
| CN | 110943640 A | | 3/2020 | |
| CN | 111030497 A | | 4/2020 | |

\* cited by examiner

ADAPTIVELY MODULATED MULTI-STATE INVERTER SYSTEM AND MODULATING METHOD THEREOF

CROSS-REFERENCE TO RELATED APPLICATIONS

The subject application claims priority of the Chinese invention application 202010839042.X filed on Aug. 19, 2020 in China. The contents and subject matter thereof are incorporated herein by reference.

FIELD OF INVENTION

The present invention relates to the field of power electronics, in particular to an adaptively modulated multi-state inverter system and a modulating method thereof.

BACKGROUND ART

As the core component for energy conversion, an inverter's performance directly relates to the efficiency and reliability of the energy conversion. However, due to the fragility of the power electronic devices in the inverter, system failures occur frequently, which directly cause economic losses in industrial production, and cause catastrophic accidents in important places such as aerospace, subways, and electric vehicles.

In the traditional fault-tolerant inverter, only the failure of the single and double power switches can be solved at most; this makes the fault-tolerant inverter to withstand fewer types of faults at this stage and somewhat limits the reliability of inverter system. However, the location and the number of the occurred faults in the inverter are at random, and we need to find an inverter strain system to adapt to and withstand multiple types of faults.

SUMMARY OF THE INVENTION

The purpose of the present invention is to provide an adaptively modulated multi-state inverter system and a modulating method thereof to solve the problem that the current fault-tolerant inverter can withstand fewer types of faults.

To solve the above technical problems, the technical solution of the present invention is to provide an adaptively modulated multi-state inverter system, including: a split capacitor; a first bridge arm, a second bridge arm, a third bridge arm and a fourth bridge arm; and an isolation switch; wherein on each of the first, second and third bridge arms a pair of complementary power switch groups is arranged;

wherein the isolation switch group comprises a first fuse, a second fuse, a third fuse and a fourth fuse as well as a first bidirectional thyristor, a second bidirectional thyristor, a third bidirectional thyristor, a fourth bidirectional thyristor, a fifth bidirectional thyristor and a sixth bidirectional thyristor;

on each output branch of the first bridge arm, the second bridge arm, and the third bridge arm, a corresponding one of the first fuse, the second fuse and the third fuse is connected in series such that the output branches of the first, second and third bridge arms output a three-phase voltage, and at the three-phase output voltage side a first shared auxiliary branch and a second shared auxiliary branch are arranged;

the first auxiliary branch starts from an output branch of the fourth bridge arm, on which output branch the fourth fuse is connected and is then connected to an output terminal of the three-phase voltage via the first, second and third bidirectional thyristors;

the second auxiliary branches starts from the DC side feed branch from the midpoint of the split capacitor, and is connected to the output terminal of the three-phase voltage via the fourth, fifth, and sixth bidirectional thyristors respectively.

The present invention also provides a modulating method of the adaptively modulated multi-state inverter system, which includes the following steps:

step A. Monitoring the four fuses in the isolation switch group in real time to obtain the number of faulty bridge arms, determining a faulty bridge arm matrix according to the number of faulty bridge arms;

step B. According to the number of faulty bridge arms, locating the faulty bridge arms and outputting the working state factor S; when the number of faulty bridge arms in the faulty bridge arm matrix is 0, S=1; when the number of faulty bridge arms in the faulty bridge arm matrix is 1, S=2; and when the number of faulty bridge arms in the faulty bridge arm matrix is 2, S=3;

step C. Calculating conduction time of the power switch in the sector N $t_{SN}=[t_1\ t_2\ t_0]$ for S, wherein $t_1$ denoting a first vector action time, $t_2$ denoting a second vector action time and $t_0$ denoting a zero vector action time: When the working state factor S≤2, a six-switch fault-tolerant modulating algorithm is adopted, the six-switch fault-tolerant modulating algorithm comprises following steps:

step 11. in the stationary coordinate system α–β, calculating a target output voltage of the inverter:

$$U_{ref}\angle\theta = U_\alpha + jU_\beta,$$

wherein $U_\alpha$ and $U_\beta$ are the components of the target voltage on axis α and β respectively;

step 12. calculating the angle $\theta_1$ between sector I and sector N in which sector the target voltage is in three-phase six-switch operating space vector diagram:

$$\begin{cases} N = \mathrm{ceil}\left(\dfrac{\theta}{\pi/3}\right) \\ \theta_1 = \mathrm{rem}\left(\dfrac{\theta}{\pi/3}\right) \end{cases};$$

step 13. calculating a working state $S_N$ of the power switch in the sector N:

$$S_N = [S_{AN}\ S_{BN}\ S_{CN}\ S_{XN}]$$
$$= \begin{cases} S_I \Lambda_1^{\frac{N-1}{2}} \Lambda_a, N = I, III, V \\ S_I \Lambda_2 \Lambda_1^{\frac{N}{2}-1} \Lambda_a, N = II, IV, VI \end{cases},$$

wherein $$\Lambda_1 = \begin{bmatrix} 0 & 1 & 0 & 0 \\ 0 & 0 & 1 & 0 \\ 1 & 0 & 0 & 0 \\ 0 & 0 & 0 & 1 \end{bmatrix}, \Lambda_2 = \begin{bmatrix} 0 & 1 & 0 & 0 \\ 1 & 0 & 0 & 0 \\ 0 & 0 & 1 & 0 \\ 0 & 0 & 0 & 1 \end{bmatrix},$$

$$\Lambda_a = \begin{bmatrix} a_{11} & 0 & 0 & a_{14} \\ 0 & a_{22} & 0 & a_{24} \\ 0 & 0 & a_{33} & a_{34} \\ 0 & 0 & 0 & 0 \end{bmatrix},$$

wherein $\Lambda_a$ is defined as the fault signal matrix for no fault or single bridge arm fault in the six-switch fault-tolerant modulating algorithm, and the elements $a_{ij}$ in $\Lambda_a$ depend on the working state of the inverter. when the inverter has no fault, the fault signal $a_{ii}=1$, $a_{i4}=0$; when a single bridge arm, gth bridge arm fails in the converter, and the hth, kth and fourth bridge arms are redundant and fault-free bridge arms, then the fault signal $a_{gg}=a_{h4}=a_{k4}=0$, $a_{gg}=a_{hh}=a_{kk}=1$;

step 14. calculating conduction time of the power switch in the sector N as follows:
when S=1, determining the first vector action time $t_1$, the second vector action time $t_2$ and the zero vector action time $t_0$ as follows:

$$\begin{cases} t_1 = \sqrt{3}\dfrac{U_{ref}}{U_{dc}}T_S\sin\left(\dfrac{\pi}{3}-\theta_1\right) \\ t_2 = \sqrt{3}\dfrac{U_{ref}}{U_{dc}}T_S\sin\theta_1 \\ t_0 = \dfrac{1}{2}(T_S - t_1 - t_2) \end{cases},$$

the conduction time of the power switch in the sector N is determined by the following equation:

$$t_{SN} = t_{SI}\Lambda_3^{N-1},$$

wherein $$\Lambda_3 = \begin{bmatrix} 0 & 1 & 0 \\ 1 & 0 & 0 \\ 0 & 0 & 1 \end{bmatrix};$$

When the working state factor S=3, a four-switch fault-tolerant modulating algorithm is adopted, the four-switch fault-tolerant modulating algorithm comprises following steps:

step 21. calculating position N of the target voltage $U_{ref}\angle\theta$ in the four-switch operating space vector sector:

$$N = \text{ceil}\left(\dfrac{\theta}{\pi/2}\right);$$

step 22. calculating an acute angle $\theta_2$ between the target voltage $U_{ref}\angle\theta$ and the axis $\alpha$:

$$\theta_2 = \begin{cases} \text{rem}\left(\dfrac{\theta}{\pi/2}\right), & N = 1, 3 \\ \dfrac{\pi}{2} - \text{rem}\left(\dfrac{\theta}{\pi/2}\right), & N = 2, 4 \end{cases};$$

step 23. calculating the four-leg switch sequence as follows: when S=1 the working state of the power switch in the sector I is known to be $S_I = [S_{AI}\ S_{BI}\ S_{CI}\ S_{XI}]$ respectively, and the working state of the power switch in the sector N when S=3 can be calculated from the following equation:

$$S_N = [S_{AN}\ S_{BN}\ S_{CN}\ S_{XN}]$$
$$= \begin{cases} S_I\Lambda_5\Lambda_4^{N-1}\Lambda_b, & N = 1, 4 \\ S_I\Lambda_6\Lambda_4^{N-2}\Lambda_b, & N = 2, 3 \end{cases},$$

wherein $$\Lambda_4 = \begin{bmatrix} 0 & 1 & 0 & 0 \\ 0 & 0 & 1 & 0 \\ 1 & 0 & 0 & 0 \\ 0 & 0 & 0 & 1 \end{bmatrix}, \Lambda_5 = \begin{bmatrix} 0 & 0 & 0 & 0 \\ 0 & 0 & 1 & 0 \\ 0 & 0 & 0 & 1 \\ 0 & 0 & 0 & 0 \end{bmatrix}, \Lambda_6 = \begin{bmatrix} 0 & 0 & 1 & 0 \\ 0 & 0 & 0 & 1 \\ 0 & 0 & 0 & 0 \\ 0 & 0 & 0 & 0 \end{bmatrix},$$

$$\Lambda_b = \begin{bmatrix} 0 & 0 & 0 & 0 \\ 0 & 0 & 0 & 0 \\ b_{31} & b_{32} & b_{33} & b_{34} \\ b_{41} & b_{42} & b_{43} & b_{44} \end{bmatrix},$$

wherein $\Lambda_b$ being a healthy signal matrix in the four-switch fault-tolerant modulating algorithm, its elements $b_{ij}$ and $a_{ij}$ depend on the working state of the inverter; when S=3 and a double bridge arm failure occurs in the inverter and only the 1st and the mth bridge arms are fault-free bridge arms and m>1, there is a healthy signal $b_{3i}=1$, $b_{4m}=1$; other elements $b_{ij}$ are all 0;

step 24. calculating conduction time of each switching o in the sector N as follows:
the conduction time of each switching of the four bridge arms can be expressed as $t_{SN}=[t_1\ t_2\ t_0]$, the first vector action time $t_1$, the second vector action time $t_2$ and the zero vector action time $t_0$ can be determined by the following equation:

$$\begin{cases} t_1 = 3\dfrac{U_{ref}}{U_{dc}}T_S\sin\left(\dfrac{\pi}{2}-\theta_2\right) \\ t_2 = \sqrt{3}\dfrac{U_{ref}}{U_{dc}}T_S\sin\theta_2 \\ t_0 = \dfrac{1}{2}(T_S - t_1 - t_2) \end{cases};$$

The adaptively modulated multi-state inverter system provided by the present invention incorporates a multi-state inverter and uses adaptive modulating technology to make the multi-state inverter to have the function of overcurrent protection, isolation of faulty bridge arm and fault-tolerant control on any single or double bridge arms; there are many types of faults that can be withstood, including not only single switch failure, double switch failures, but also three switch failures and four switch failures; after any single bridge arm failure occurs and successful fault-tolerant is achieved, the function of fault-tolerant control can still be realized even if the single bridge arm failure occurs again and further leads to a successive double bridge arm failures.

The modulating method of an adaptively modulated multi-state inverter system of the present invention is a space vector modulating technology based on adaptive controlment, which can flexibly modulate healthy bridge arms according to the specific working state factors of the multi-state inverter. First of all, it is necessary to monitor the working state of the fuse in real time. When any single or double bridge arms fails, the fuse on the corresponding faulty phase will be automatically blown to activate the function of isolating the faulty bridge arm and determine the faulty bridge arm matrix, so as to determine the working state factor according to the number of faulty bridge arms; finally, the function of modulating healthy bridge arms is realized by the working state factor.

EMBODIMENTS

In the following, an adaptive modulated multi-state inverter system and its modulating method of the present invention will be further described in detail with reference to the accompanying drawings and specific embodiments. According to the following description and claims, the advantages and features of the present invention will be clearer. It should be noted that the drawings are in a very simplified form and use imprecise ratios, which are only used to conveniently and clearly assist in explaining the purpose of the embodiments of the present invention.

Figure 1:
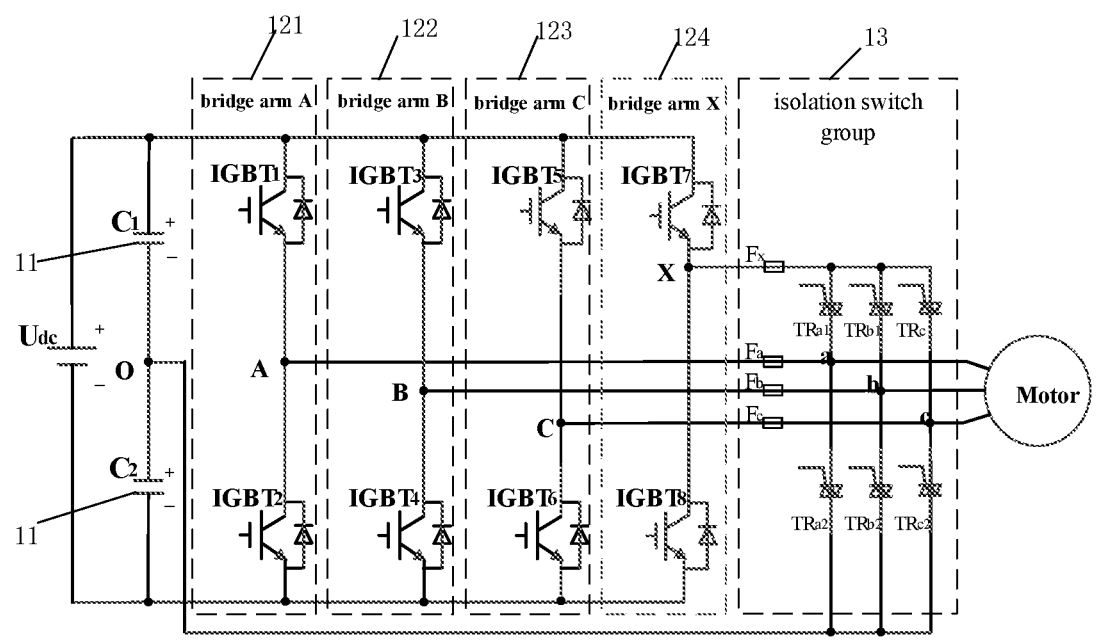
FIG. 1 is a schematic circuit diagram of an adaptive modulated multi-state inverter system in one embodiment of the present invention.

FIG. 1 is a schematic circuit diagram of an adaptive modulated multi-state inverter system in one embodiment of the present invention. Referring to FIG. 1, an adaptively modulated multi-state inverter system is provided, including: a split capacitor 11; four bridge arms, each has a pair of complementary power switch groups; an isolation switch group 13, including four fuses and six bidirectional thyristors. The fuses $F_a$, $F_b$, $F_c$ are respectively connected in series on the output branches of the first bridge arm 121, the second bridge arm 122, and the third bridge arm 123 which output a three-phase voltage, and at the three-phase output voltage side two shared auxiliary branches are arranged, one of the auxiliary branches starts from the output branch of the fourth bridge arm 124, on which output branch a fuse $F_x$ is connected, and is then connected to the output terminal of the three-phase voltage via three bidirectional thyristors $TR_{a1}$, $TR_{b1}$ and $TR_{c1}$; the other of the auxiliary branches states from the DC side feed branch drawn from the midpoint of the split capacitor, and is directly connected to the output terminal of the three-phase voltage via three bidirectional thyristors $TR_{a2}$, $TR_{b2}$ and $TR_{c2}$ respectively.

To facilitate describing the technical solution, in the embodiment of the present invention, the first bridge arm is named bridge arm A, comprising the power switch group IGBT1, IGBT2, the second bridge arm is named bridge arm B, comprising the power switch group IGBT3, IGBT4, and the third bridge arm is named bridge arm C, comprising the power switch group IGBT5, IGBT6, and the fourth bridge arm is named bridge arm X, comprising the power switch group IGBT7, IGBT8.

The adaptively modulated multi-state inverter system can withstand any single or double-arm failure. Table 1 is a list of the types of failures that an adaptively modulated multi-state inverter system can withstand. Referring to Table 1, the embodiment of the present invention mainly includes 36 types of switch faults, including not only 6 single switch faults, 15 double switch faults, but also 12 types of three switch faults and 3 types of four switch faults.

TABLE 1

| Number of fault switches | Fault switch | Faulty bridge arm | Number of fault bridge arm |
|---|---|---|---|
| single switch fault | IGBT1 fault | bridge arm A | single bridge arm fault |
| | IGBT2 fault | bridge arm A | |
| | IGBT3 fault | bridge arm B | |
| | IGBT4 fault | bridge arm B | |
| | IGBT5 fault | bridge arm C | |
| | IGBT6 fault | bridge arm C | |
| double switch faults | IGBT1↘2 fault | bridge arm A | |
| | IGBT3↘4 fault | bridge arm B | |
| | IGBT5↘6 fault | bridge arm C | |
| | IGBT1↘3 fault | bridge arms A&B | double bridge arm fault |
| | IGBT1↘4 fault | bridge arms A&B | |
| | IGBT2↘3 fault | bridge arms A&B | |
| | IGBT2↘4 fault | bridge arms A&B | |
| | IGBT3↘5 fault | bridge arms B&C | |
| | IGBT3↘6 fault | bridge arms B&C | |
| | IGBT4↘5 fault | bridge arms B&C | |
| | IGBT4↘6 fault | bridge arms B&C | |
| | IGBT5↘1 fault | bridge arms C&A | |
| | IGBT5↘2 fault | bridge arms C&A | |
| | IGBT6↘1 fault | bridge arms C&A | |
| | IGBT6↘2 fault | bridge arms C&A | |
| three switch faults | IGBT1↘2↘3 fault | bridge arms A&B | |
| | IGBT1↘2↘4 fault | bridge arms A&B | |
| | IGBT1↘3↘4 fault | bridge arms A&B | |
| | IGBT2↘3↘4 fault | bridge arms A&B | |
| | IGBT3↘4↘5 fault | bridge arms B&C | |
| | IGBT3↘4↘6 fault | bridge arms B&C | |
| | IGBT3↘5↘6 fault | bridge arms B&C | |
| | IGBT4↘5↘6 fault | bridge arms B&C | |
| | IGBT5↘6↘1 fault | bridge arms C&A | |
| | IGBT5↘6↘2 fault | bridge arms C&A | |
| | IGBT5↘1↘2 fault | bridge arms C&A | |
| | IGBT6↘1↘2 fault | bridge arms C&A | |
| four switch faults | IGBT1↘2↘3↘4 fault | bridge arms A&B | |
| | IGBT3↘4↘5↘6 fault | bridge arms B&C | |
| | IGBT5↘6↘1↘2 fault | bridge arms C&A | |

Figure 2:
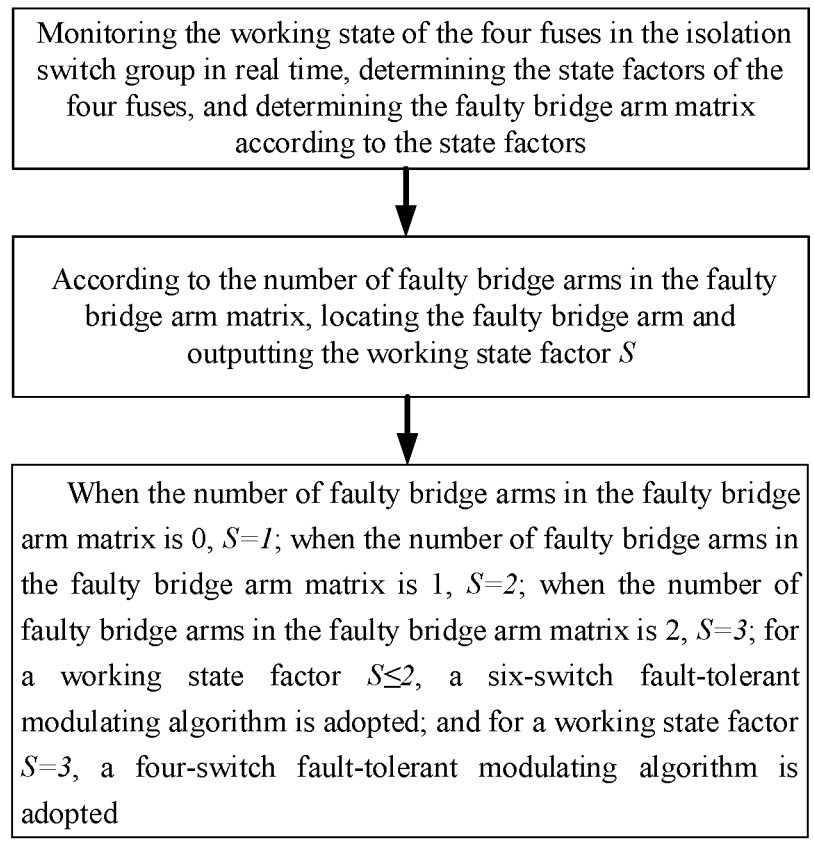
FIG. 2 is a flowchart of the steps of a modulating method of the adaptive modulated multi-state inverter system of the present invention.

FIG. 2 is the flowchart of the steps of a modulating method of an adaptively modulated multi-state inverter system of the present invention. Referring to FIG. 2, the present invention also provides a modulating method of an adaptively modulated multi-state inverter system, which includes the following steps:

step A: Monitoring the working state of the four fuses in the isolation switch group in real time, determining the state factors of the four fuses, and determining the faulty bridge arm matrix according to the state factors;

step B: According to the number of faulty bridge arms in the faulty bridge arm matrix, locating the faulty bridge arm and outputting the working state factor S;

step C: When the number of faulty bridge arms in the faulty bridge arm matrix is 0, S=1; when the number of faulty bridge arms in the faulty bridge arm matrix is 1, S=2; when the number of faulty bridge arms in the faulty bridge arm matrix is 2, S=3; when the working state factor S≤3, a six-switch fault-tolerant modulating algorithm is adopted; and when the working state factor S=3, a four-switch fault-tolerant modulating algorithm is adopted.

Specifically in step A, the working state of the four fuses $F_a$, $F_b$, $F_c$ and $F_x$ in the isolation switch group is monitored in real time, and the state factors of the four fuses $f_a$, $f_b$, $f_c$ and $f_x$ is determined, and also the faulty bridge arm matrix $F=[f_a\ f_b\ f_c\ f_x]$ is determined. Specifically, when the fuse is working normally, its state factor is set to be 0, and when the fuse is blown due to an overcurrent caused by a faulty bridge arm, its state factor is set to be 1.

The failure of any bridge arm in the inverter will generate an overcurrent, which will make a corresponding fuse ($F_a$, $F_b$, $F_c$ or $F_x$) in the isolation switch group to automatically blow due to the heat generated by itself. In this way, the function of isolating the faulty bridge arm is automatically activated, and the entire system is protected from further damage caused by the faulty bridge arm.

Based on the number of faulty bridge arms in the faulty bridge arm matrix F, the faulty bridge arms can be located, thereby the corresponding optimal working state can be determined, and the working state factor S can be output.

Table 2 is a classification of fault-tolerant working state. Referring to Table 2, when the number of faulty bridge arms in the faulty bridge arm matrix F is 0, S=1; when the number of faulty bridge arms in the faulty bridge arm matrix F is 1, S=2; and when the number of faulty bridge arms in the faulty bridge arm matrix F is 2, S=3.

TABLE 2

| faulty bridge arm matrix F | faulty bridge arm | working state factor S |
|---|---|---|
| [0 0 0 0] | — | 1 |
| [1 0 0 0] | bridge arm A | 2 |
| [0 1 0 0] | bridge arm B | 2 |
| [0 0 1 0] | bridge arm C | 2 |
| [1 1 0 0] | bridge arms A&B | 3 |
| [0 1 1 0] | bridge arms B&C | 3 |
| [1 0 1 0] | bridge arms C&A | 3 |
| [1 0 0 1] | bridge arms A&X | 3 |
| [0 1 0 1] | bridge arms B&X | 3 |
| [0 0 1 1] | bridge arms C&X | 3 |

Figure 3:
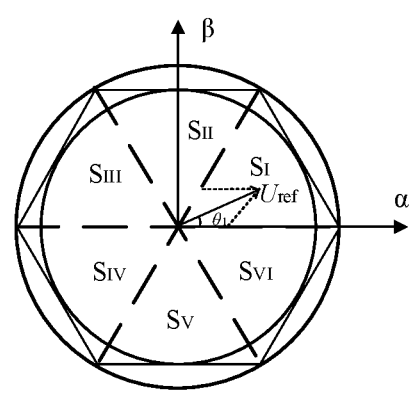
FIG. 3 is a space vector diagram of a multi-state fault-tolerant inverter when S≤2 in one embodiment of the present invention.

When the working state factor S≤2, the six-switch fault-tolerant modulating algorithm is adopted, specifically as follows:

In the space vector modulating algorithm based on sector conversion, the six-switch fault-tolerant modulating algorithm can be used for the multi-state fault-tolerant inverter when S=1 or S=2. FIG. 3 is a space vector diagram of a multi-state fault-tolerant inverter when S≤2 in one embodiment of the present invention. Referring to FIG. 3, in the stationary coordinate system α–β, the target output voltage of the inverter should be:

$$U_{ref}\angle\theta = U_\alpha + jU_\beta \qquad (1)$$

wherein $U_\alpha$ and $U_\beta$ are the components of the target voltage on axis α and β respectively.

In the stationary coordinate system α–β, the sector N in the three-phase six-switch operating space vector diagram can be determined according to the angle θ of the target voltage $U_{ref}\angle\theta$. In addition, the remainder calculation of θ will be performed to convert the target voltage to the sector I and obtain the angle $\theta_1$ of the sector I as shown in FIG. 3.

$$\begin{cases} N = \mathrm{ceil}\left(\dfrac{\theta}{\pi/3}\right) \\ \theta_1 = \mathrm{rem}\left(\dfrac{\theta}{\pi/3}\right) \end{cases} \qquad (2)$$

Figure 4A:
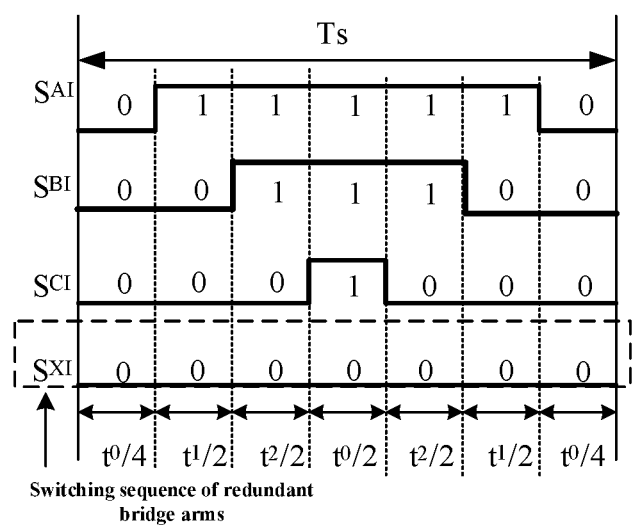
FIG. 4a is a switching sequence diagram in the sector I of the multi-state fault-tolerant inverter with no fault and when S≤2 in one embodiment of the present invention.

FIG. 4a is a switching sequence diagram in the sector I when the multi-state fault-tolerant inverter with no fault and S≤2 in one embodiment of the present invention. Referring to FIG. 4a, the working state of the power switch in the sector I is $S_I=[S_{AI}\ S_{BI}\ S_{CI}\ S_{XI}]$ when S=1. The specific switching sequence is exemplified by the seven-segment type as shown in FIG. 4a. When S≤2, the working state $S_N$ of the power switch in the sector N can be obtained by the following equation:

$$S_N = [S_{AN}\ S_{BN}\ S_{CN}\ S_{XN}] \qquad (3)$$

$$= \begin{cases} S_1\Lambda_1^{\frac{N-1}{2}}\Lambda_a, & N = I, III, V \\ S_1\Lambda_2\Lambda_1^{\frac{N}{2}-1}\Lambda_a, & N = II, IV, VI \end{cases}$$

wherein $\Lambda_1 = \begin{bmatrix} 0 & 1 & 0 & 0 \\ 0 & 0 & 1 & 0 \\ 1 & 0 & 0 & 0 \\ 0 & 0 & 0 & 1 \end{bmatrix}$, $\Lambda_2 = \begin{bmatrix} 0 & 1 & 0 & 0 \\ 1 & 0 & 0 & 0 \\ 0 & 0 & 1 & 0 \\ 0 & 0 & 0 & 1 \end{bmatrix}$, $\Lambda_a = \begin{bmatrix} a_{11} & 0 & 0 & a_{14} \\ 0 & a_{22} & 0 & a_{24} \\ 0 & 0 & a_{33} & a_{34} \\ 0 & 0 & 0 & 0 \end{bmatrix}$.

$\Lambda_a$ is defined as the fault signal matrix for no fault (S=1) or single bridge arm fault (S=2) in the six-switch fault-tolerant modulating algorithm, and the elements $a_{ij}$ in $\Lambda_a$ depend on the working state of the inverter. When the inverter has no fault (S=1), the fault signal $a_{ii}=1$, $a_{i4}=0$; when a single bridge arm, gth bridge arm, fails, a hth and a kth bridge arm are fault-free and the fourth bridge arm is redundant, then the fault signal $a_{gg}=a_{h4}=a_{k4}=0$, $a_{gg}=a_{hh}=a_{kk}=1$; wherein the gth, hth and kth bridge arm is one of the first, second, and third bridge arm respectively;

Now calculate the conduction time of the power switch in the sector N. Specifically, the conduction time of the power switch in the sector I is $t_{SI}=[t_1\ t_2\ t_0]$ when S=1, the first vector action time $t_1$, the second vector action time $t_2$ and the zero vector action time $t_0$ are determined by the following equation:

$$\begin{cases} t_1 = \sqrt{3}\dfrac{U_{ref}}{U_{dc}}T_S \sin\left(\dfrac{\pi}{3} - \theta_1\right) \\ t_2 = \sqrt{3}\dfrac{U_{ref}}{U_{dc}}T_S \sin\theta_1 \\ t_0 = \dfrac{1}{2}(T_S - t_1 - t_2) \end{cases} \quad (4)$$

In the case of no failure or single bridge arm failure, the conduction time of the power switch in the sector N is determined by the following factors:

$$t_{SN} = t_{SI}\Lambda_3^{N-1} \quad (5)$$

$$\text{wherein } \Lambda_3 = \begin{bmatrix} 0 & 1 & 0 \\ 1 & 0 & 0 \\ 0 & 0 & 1 \end{bmatrix}.$$

Figure 4B:
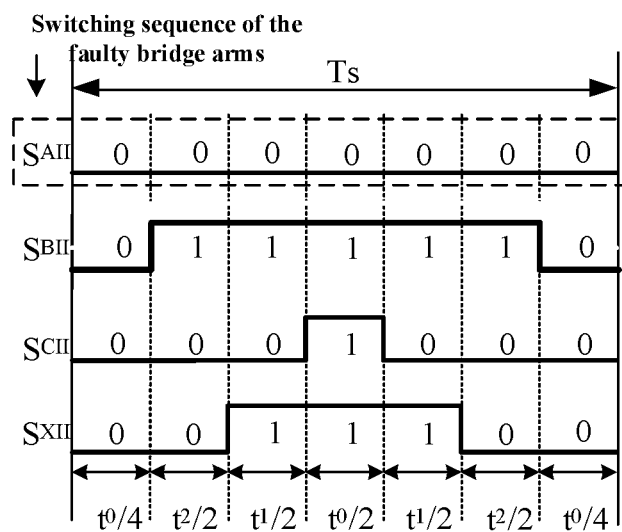
FIG. 4b is a switching sequence diagram in the sector II of multi-state fault-tolerant inverter the with fault in phase A and when S≤2 in one embodiment of the present invention.

The proposed six-switch fault-tolerant modulating algorithm adopts the scheme of directly outputting the PWM pulse signal. From the seven-segment switching sequence of the ABCX phase in the sector I when S=1, the seven-segment switching sequence in the other sectors under the normal and single-arm faults can be obtained, which indirectly determines the order of action of each voltage vector. FIG. 4b provides a switching sequence diagram in the sector II when the multi-state fault-tolerant inverter with fault in phase A and S≤2. When a phase A single-bridge-arm failure occurs in the inverter, the working state factor S=2. Then when in the second sector N=II, the switching sequence of the voltage vector of the four bridge arms can be calculated from the equation (3), as shown in FIG. 4b.

When the working state factor S=3, a four-switch fault-tolerant modulating algorithm is adopted.

Figure 5:
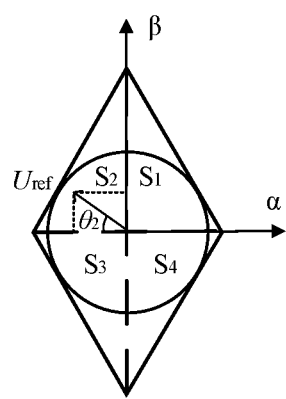
FIG. 5 is a space vector diagram of a multi-state fault-tolerant inverter when S=3 in one embodiment of the present invention.

FIG. 5 is a space vector diagram of a multi-state fault-tolerant inverter when S=3 in one embodiment of the present invention. Referring to FIG. 5, when S=3, it is needed to switch to the four-switch fault-tolerant modulating algorithm, no matter the target voltage $U_{ref}\angle\theta$ is located in any sector, which can be determined by recombining the relevant parameters of the $S_I$ in the sector I of the three-phase six-switch operating space vector diagram when S=1 in FIG. 3.

The position of the target voltage $U_{ref}\angle\theta$ in the four-switch operating space vector sector is:

$$N = \text{ceil}\left(\dfrac{\theta}{\pi/2}\right) \quad (6)$$

$\theta_2$ shown in FIG. 5 is defined as the acute angle between the target voltage $U_{ref}\angle\theta$ and the axis $\alpha$, which is determined by the following equation:

$$\theta_2 = \begin{cases} \text{rem}\left(\dfrac{\theta}{\pi/2}\right), N = 1, 3 \\ \dfrac{\pi}{2} - \text{rem}\left(\dfrac{\theta}{\pi/2}\right), N = 2, 4 \end{cases} \quad (7)$$

Now calculate the four-leg switch sequence as follows:
Same as above, when S=1 the working state of the power switch in the sector I is known to be $S_I=[S_{AI}\ S_{BI}\ S_{CI}\ S_{XI}]$ respectively, and the working state of the power switch in the sector N when S=3 can be calculated from the following equation.

$$S_N = [S_{AN}\ S_{BN}\ S_{CN}\ S_{XN}] \quad (8)$$

$$= \begin{cases} S_I \Lambda_5 \Lambda_4^{N-1} \Lambda_b, N = 1, 4 \\ S_I \Lambda_6 \Lambda_4^{N-2} \Lambda_b, N = 2, 3 \end{cases}$$

$$\text{wherein } \Lambda_4 = \begin{bmatrix} 1 & 0 & 0 & 0 \\ 0 & 1 & 0 & 0 \\ 0 & 0 & 0 & 1 \\ 0 & 0 & 1 & 0 \end{bmatrix}, \Lambda_5 = \begin{bmatrix} 0 & 0 & 0 & 0 \\ 0 & 0 & 1 & 0 \\ 0 & 0 & 0 & 1 \\ 0 & 0 & 0 & 0 \end{bmatrix},$$

$$\Lambda_6 = \begin{bmatrix} 0 & 0 & 1 & 0 \\ 0 & 0 & 0 & 1 \\ 0 & 0 & 0 & 0 \\ 0 & 0 & 0 & 0 \end{bmatrix}, \Lambda_b = \begin{bmatrix} 0 & 0 & 0 & 0 \\ 0 & 0 & 0 & 0 \\ b_{31} & b_{32} & b_{33} & b_{34} \\ b_{41} & b_{42} & b_{43} & b_{44} \end{bmatrix}.$$

$\Lambda_b$ being a healthy signal matrix in the four-switch fault-tolerant modulating algorithm, its elements $b_{ij}$ and $a_{ij}$ also depend on the working state of the inverter. When S=3, which means a double bridge arm failure occurs in the inverter, only the 1st and the mth bridge arms are fault-free bridge arms and m>1, there is a healthy signal $b_{3i}=1$, $b_{4m}=1$; other elements $b_{ij}$ are all 0.

Now calculate conduction time in the sector N as follows:
The conduction time of each switching of the four bridge arms can be expressed as $t_{SN}=[t_1\ t_2\ t_0]$, which means each sector has the same conduction time of each switching. The first vector action time $t_1$, the second vector action time $t_2$ and the zero vector action time $t_0$ can also be determined by the following equation:

$$\begin{cases} t_1 = 3\dfrac{U_{ref}}{U_{dc}}T_S \sin\left(\dfrac{\pi}{2} - \theta_2\right) \\ t_2 = \sqrt{3}\dfrac{U_{ref}}{U_{dc}}T_S \sin\theta_2 \\ t_0 = \dfrac{1}{2}(T_S - t_1 - t_2) \end{cases} \quad (9)$$

Figure 6A:
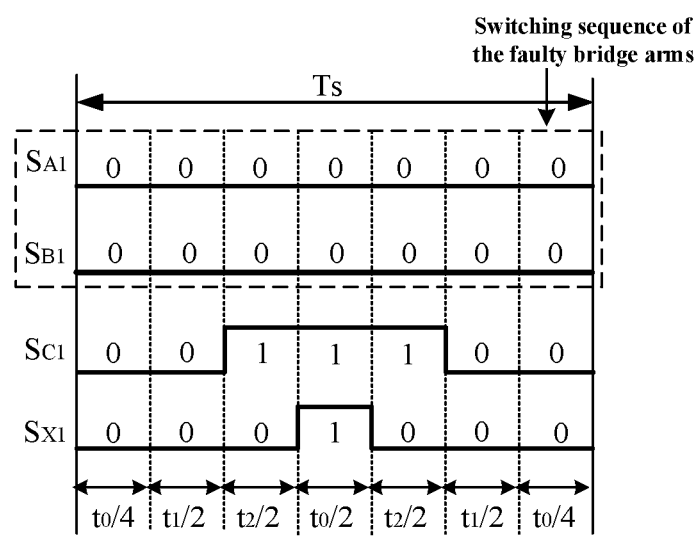
FIG. 6a is a switching sequence diagram in the sector I of the multi-state fault-tolerant inverter with fault in phases A&B and when S=3 in one embodiment of the present invention.
Figure 6B:
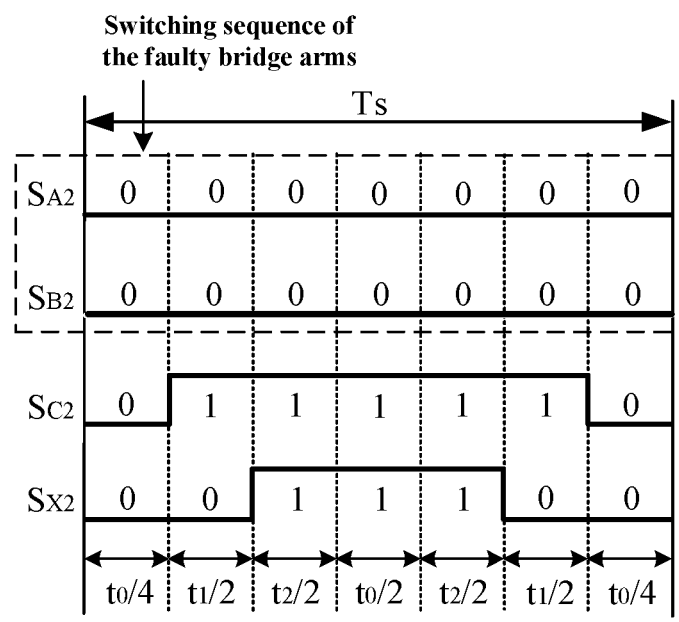
FIG. 6b is a switching sequence diagram in the sector II of the multi-state fault-tolerant inverter with fault in phases A&B and when S=3 in one embodiment of the present invention.

The proposed four-switch fault-tolerant modulating algorithm adopts the scheme of directly outputting the PWM pulse signal. From the seven-stage switching sequence of phases A, B, C and X in the sector I (as shown in FIG. 4a) when S=1, the seven-segment switching sequence in other sectors under other working conditions can be obtained for double bridge arm failure when S=3, thereby the order of action of each voltage vector can be indirectly determined. FIG. 6a is a switching sequence diagram in the sector I in the embodiment of the present invention when the A&B phases of the multi-state fault-tolerant inverter fails which means S=3; FIG. 6b is a switching sequence diagram in the sector II in the embodiment of the present invention when the A&B phases of the multi-state fault-tolerant inverter fails which means S=3. Referring to FIG. 6a and FIG. 6b, when the inverter is in the state of A&B double-bridge-arm fault which means S=3, according to the above equations, the switching sequence in the sector I and the sector II can be obtained.

Obviously, those skilled in the art are capable of making various changes and modifications to the present invention without departing from the spirit and scope of the present invention, which shall fall within the scope of the claims of the present invention.

The invention claimed is:

1. An adaptively modulated multi-state inverter system, comprising: a split capacitor, a first bridge arm, a second bridge arm, a third bridge arm, a fourth bridge arm and an isolation switch;
    wherein on each of the first, second and third bridge arms a pair of complementary power switch groups is arranged;
    the isolation switch group comprises a first fuse, a second fuse, a third fuse and a fourth fuse as well as a first bidirectional thyristor, a second bidirectional thyristor, a third bidirectional thyristor, a fourth bidirectional thyristor, a fifth bidirectional thyristor and a sixth bidirectional thyristor;
    on each output branch of the first bridge arm, the second bridge arm, and the third bridge arm, a corresponding one of the first fuse, the second fuse and the third fuse is connected in series such that the output branches of the first, second and third bridge arms output a three-phase voltage, and at a three-phase output voltage side a first shared auxiliary branch and a second shared auxiliary branch are arranged;
    the first auxiliary branch starts from an output branch of the fourth bridge arm, on which output branch the fourth fuse is connected and is then connected to an output terminal of the three-phase voltage via the first, second and third bidirectional thyristors respectively;
    the second auxiliary branches starts from a DC side feed branch from a midpoint of the split capacitor, and is connected to the output terminal of the three-phase voltage via the fourth, fifth, and sixth bidirectional thyristors respectively.

2. A modulating method of the adaptively modulated multi-state inverter system of claim 1, comprising the following steps:
    step A. monitoring the four fuses in the isolation switch group in real time to obtain a number of faulty bridge arms, determining a faulty bridge arm matrix according to the number of faulty bridge arms;
    step B. locating the faulty bridge arms and outputting a working state factor S according to the number of faulty bridge arms: setting S=1 when the number of faulty bridge arms in the faulty bridge arm matrix is 0; setting S=2 when the number of faulty bridge arms in the faulty bridge arm matrix is 1; setting S=3 when the number of faulty bridge arms in the faulty bridge arm matrix is 2;
    step C. calculating conduction time of the power switch in a sector N $t_{SN}=[t_1\ t_2\ t_0]$ for S, wherein $t_1$ denoting a first vector action time, $t_2$ denoting a second vector action time and $t_0$ denoting a zero vector action time:
    when the working state factor S≤2, going to step 11, otherwise going to step 21:
    step 11. in a stationary coordinate system α–β, calculating a target output voltage of the inverter:
    $U_{ref}\angle\theta=U_\alpha+jU_\beta$
    wherein $U_\alpha$ and $U_\beta$ are components of a target voltage on axis α and β respectively;
    step 12. calculating an angle $\theta_1$ between a sector I and the sector N wherein the target voltage is in three-phase six-switch operating space vector diagram:
    $$\begin{cases} N = ceil\left(\dfrac{\theta}{\pi/3}\right) \\ \theta_1 = rem\left(\dfrac{\theta}{\pi/3}\right) \end{cases};$$
    step 13. calculating a working state $S_N$ of the power switch in the sector N:
    $$S_N = [S_{AN}\ S_{BN}\ S_{CN}\ S_{XN}],$$
    $$= \begin{cases} S_1\Lambda_1^{\frac{N-1}{2}}\Lambda_a, N = I, III, V \\ S_1\Lambda_2\Lambda_1^{\frac{N}{2}-1}\Lambda_a, N = II, IV, VI \end{cases}$$
    wherein $\Lambda_1 = \begin{bmatrix} 0 & 1 & 0 & 0 \\ 0 & 0 & 1 & 0 \\ 1 & 0 & 0 & 0 \\ 0 & 0 & 0 & 1 \end{bmatrix}$,
    $\Lambda_2 = \begin{bmatrix} 0 & 1 & 0 & 0 \\ 1 & 0 & 0 & 0 \\ 0 & 0 & 1 & 0 \\ 0 & 0 & 0 & 1 \end{bmatrix}$, $\Lambda_a = \begin{bmatrix} a_{11} & 0 & 0 & a_{14} \\ 0 & a_{22} & 0 & a_{24} \\ 0 & 0 & a_{33} & a_{34} \\ 0 & 0 & 0 & 0 \end{bmatrix}$, $\Lambda_a$ denoting fault signal matrix for no fault or single bridge arm fault, and elements $a_{ij}$ in $\Lambda_a$ representing working state of the inverter; when the inverter has no fault, setting $a_{ii}=1$, $a_{i4}=0$; when a single bridge arm, gth bridge arm, fails, an hth and a kth bridge arm are fault-free and the fourth bridge arm is redundant, setting $a_{gg}=a_{h4}=a_{k4}=0$, $a_{gg}=a_{hh}=a_{kk}=1$; wherein the gth, hth and kth bridge arm is one of the first, second, and third bridge arm respectively;
    step 14. calculating the conduction time of the power switch in the sector N as follows: when S=1, determining the first vector action time $t_1$, the second vector action time $t_2$ and the zero vector action time $t_0$ as follows:
    $$\begin{cases} t_1 = \sqrt{3}\dfrac{U_{ref}}{U_{dc}}T_S\ \sin\left(\dfrac{\pi}{3} - \theta_1\right) \\ t_2 = \sqrt{3}\dfrac{U_{ref}}{U_{dc}}T_S\ \sin\theta_1 \\ t_0 = \dfrac{1}{2}(T_S - t_1 - t_2) \end{cases};$$
    obtaining conduction time of the power switch in the sector N as follows:
    $$t_{SN} = t_{SI}\Lambda_3^{N-1},$$
    wherein $\Lambda_3 = \begin{bmatrix} 0 & 1 & 0 \\ 1 & 0 & 0 \\ 0 & 0 & 1 \end{bmatrix}$;

going to step D;
    step 21. calculating position N of the target voltage $U_{ref}\angle\theta$ in the four-switch operating space vector sector:
    $$N = ceil\left(\dfrac{\theta}{\pi/2}\right);$$
    step 22. calculating an acute angle $\theta_2$ between the target voltage $U_{ref}\angle\theta$ and the axis α:

$$\theta_2 = \begin{cases} \text{rem}\left(\dfrac{\theta}{\pi/2}\right), & N = 1, 3 \\ \dfrac{\pi}{2} - \text{rem}\left(\dfrac{\theta}{\pi/2}\right), & N = 2, 4 \end{cases} ;$$

step 23. calculating a four-leg switch sequence as follows: when S=3 with working state of the power switch in the sector I being denoted as $S_I = [S_{AI}\ S_{BI}\ S_{CI}\ S_{XI}]$, calculating the working state of the power switch in the sector N as follows:

$$S_N = [S_{AN}\ S_{BN}\ S_{CN}\ S_{XN}]$$
$$= \begin{cases} S_I \Lambda_5 \Lambda_4^{N-1} \Lambda_b, & N = 1, 4 \\ S_I \Lambda_6 \Lambda_4^{N-2} \Lambda_b, & N = 2, 3 \end{cases},$$

wherein $\Lambda_4 = \begin{bmatrix} 1 & 0 & 0 & 0 \\ 0 & 1 & 0 & 0 \\ 0 & 0 & 0 & 1 \\ 0 & 0 & 1 & 0 \end{bmatrix}$, $\Lambda_5 = \begin{bmatrix} 0 & 0 & 0 & 0 \\ 0 & 0 & 1 & 0 \\ 0 & 0 & 0 & 1 \\ 0 & 0 & 0 & 0 \end{bmatrix}$, $\Lambda_6 = \begin{bmatrix} 0 & 0 & 1 & 0 \\ 0 & 0 & 0 & 1 \\ 0 & 0 & 0 & 0 \\ 0 & 0 & 0 & 0 \end{bmatrix}$, $\Lambda_b = \begin{bmatrix} 0 & 0 & 0 & 0 \\ 0 & 0 & 0 & 0 \\ b_{31} & b_{32} & b_{33} & b_{34} \\ b_{41} & b_{42} & b_{43} & b_{44} \end{bmatrix}$, wherein $\Lambda_b$ being a healthy signal matrix; setting elements $b_{ij}$ as follows: for S=3 and a double bridge arm failure occurrence in the inverter, with a 1st and an mth bridge arms being fault-free bridge arms and m>1, setting $b_{3I}=1$, $b_{4m}=1$; setting other elements $b_{ij}$ to be 0;

step 24. calculating the conduction time of the power switch in the sector N as follows:

determining the first vector action time $t_1$, the second vector action time $t_2$ and the zero vector action time $t_0$ by the following equation:

$$\begin{cases} t_1 = 3\dfrac{U_{ref}}{U_{dc}} T_S \sin\left(\dfrac{\pi}{2} - \theta_2\right) \\ t_2 = \sqrt{3}\dfrac{U_{ref}}{U_{dc}} T_S \sin \theta_2 \\ t_0 = \dfrac{1}{2}(T_S - t_1 - t_2) \end{cases} ;$$

obtaining conduction time of the power switch in the sector N as follows:

$t_{SN} = [t_1\ t_2\ t_0]$;

step D. outputting PWM pulse signals based on the conduction time of the power switch in the sector N to realize fault tolerance.

\* \* \* \* \*